(12) United States Patent
Crowder, Jr. et al.

(10) Patent No.: US 6,606,529 B1
(45) Date of Patent: Aug. 12, 2003

(54) COMPLEX SCHEDULING METHOD AND DEVICE

(75) Inventors: George E. Crowder, Jr., Fairfax, VA (US); Jerry L. Mehlberg, Burke, VA (US)

(73) Assignee: Frontier Technologies, Inc., Santa Barbara, CA (US)

(*) Notice: Subject to any disclaimer, the term of this patent is extended or adjusted under 35 U.S.C. 154(b) by 497 days.

(21) Appl. No.: 09/591,278

(22) Filed: Jun. 9, 2000

(51) Int. Cl.[7] .............................................. G06F 19/00
(52) U.S. Cl. ........................................ 700/100; 705/8
(58) Field of Search ................... 700/100, 99, 97; 705/8–9

(56) References Cited

U.S. PATENT DOCUMENTS 5,369,570 A * 11/1994 Parad ............................ 705/8
5,764,981 A * 6/1998 Brice et al. .................. 395/671
2001/0049619 A1 * 12/2001 Powell et al. ................ 705/9
2002/0107600 A1 * 8/2002 Crampton et al. ........... 700/100

* cited by examiner

*Primary Examiner*—John Follansbee
*Assistant Examiner*—Ronald D Hartman, Jr.
(74) *Attorney, Agent, or Firm*—Michael G. Petit

(57) ABSTRACT

A device and method for the real time optimization of scheduling for manufacturing and information transfer systems and similar applications. The device is a computer readable medium whose contents cause a computer system to generate an optimal solution to a scheduling problem in accordance with a method encoded on the medium. The method employs a filtering algorithm to schedule minimally-conflicting events. The remaining unscheduled events are partitioned into non-interactive sub-sets. Following partitioning, artificial intelligence is used to select one of a plurality of algorithms which is employed to provide an optimal scheduling solution for each sub-set of scheduling requests. The purpose of artificial intelligence is to recognize certain characteristics in request data comprising each sub-set of event scheduling requests and select an algorithm which is optimal for scheduling each particular sub-set.

4 Claims, 2 Drawing Sheets

| | | | |
|---|---|---|---|
| ζ | Reference vector ⇒ zero conflicts | κ | Conflict vector |
| Γ | Compensator | Ψ | Control vector ⇒ reduces conflicts |
| σ | Scheduler | Q | Request vector ⇒ factors beyond control of scheduler |
| S | Schedule | | |

COMPLEX SCHEDULING METHOD AND DEVICE

ACKNOWLEDGEMENT

This invention was made with Government support under contract number F29601-99-C-0072 awarded by the Air Force Research Laboratory, Det 8/PKVS, Space Vehicles Directorate. The Government has certain rights in the invention.

BACKGROUND OF THE INVENTION

1. Field of the Invention

A method and device for scheduling a plurality of events.

2. Prior Art

Scheduling in general, including scheduling of a manufacturer's supply chain for time-sensitive and complex manufacturing operations while satisfying resource, geographic, temporal and operating constraints, is a highly complex, non-linear problem that falls into a notoriously difficult mathematical class of hard to solve problems (technically, "NP-hard"). Manual scheduling, even when computer-assisted, is expensive in terms of time, manpower, and funds and produces far less than optimal scheduling of critical resources for critical manufacturing requirements.

The prior art methods for automating supply chain scheduling for manufacturing systems produce solutions that are "adequate" (however defined), but often far from optimal, sometimes leading to bottlenecks, excess supply inventories, supply shortages, or temporal disconnects, all of which may disrupt the manufacturing process and drive up unit production costs. This is especially so for manufacturing of leading edge products and/or where large numbers of companies are involved in the manufacturing process. Automated real-time and optimal supply chain scheduling for manufacturing systems would increase scheduling (and hence manufacturing) effectiveness and reduce unit production costs by avoiding the negative consequences of non-optimal scheduling.

Past attempts at mathematically optimal scheduling have usually employed a single promising artificial intelligence (AI) or operations research (OR) methodology in a "brute force" computational assault on the problem. Each such methodology has weaknesses relative to solving large-scale, computationally complex supply chain scheduling problems. Generally speaking, manufacturing supply chain scheduling problems exhibit the following characteristics: (a) a large number of constrained resources that must be scheduled in order to accomplish the manufacturing process; (b) complexity in terms of geographic and temporal geometry; (c) time sensitive actions to be scheduled; and (d) present a large problem/solution space typically proportional to m!, where m is the number of supply chain events to be scheduled within the problem time horizon with worst-case single algorithm solution times that are exponential in m.

Computational complexity theory (CCT) deals with the time (T) it takes an algorithm implemented in a computer program to solve a problem. Typically, the computational complexity of a problem is classified according to the time needed to solve it on a Turing Machine (TM), defined as a finite state machine with an infinite read-write tape. T is expressed as a function of n, where n is a measure of the size of the input or the number of inputs to the TM for solving the problem. In CCT, T as a function of n, T(n), is generally expressed in "order-of-magnitude" form $O$ $(f(n))$. $T(n)=O$ $(f(n))$ means there exists constants k and n such that $$T(n) \leq k|f(n)| \text{ for } n \geq n_0 \quad (1)$$

For example, suppose that solution time for a problem is given by $T(n)=5n+2$. In this case, $T(n)=O(n)$ since $5n+2 \leq 6n$ for $n \geq 2$ (i.e., f (n)=n, k=6, and $n_0==2$). If $T$ (n) is a polynomial of the form $$T(n)=a_i n^i + a_{i-1} n^{i-1} + \ldots + a_1 n + a_0 \quad (2)$$

then $T(n)=O(n^i)$; i.e., all constants and low-order terms are ignored. Thus for $T(n)=O$ $(n^2)$, a doubling of the size of the problem quadruples the solution time required. It is common and useful to classify problems according to their order of magnitude time complexities.

A problem is polynomial or polynomial time if its solution time on a TM is given by $T$ $(n)=O$ $(n^b)$ for some constant b: solution time is constant if b=0, linear if b=1, quadratic if b=2, etc. Solution time is exponential if $T(n)=O(b^{h(n)})$ for constant b and polynomial h(n). For large n, the order of magnitude complexity of a problem can make a dramatic difference in solution times.

The class of problems P that are solvable in polynomial time are considered tractable because they can usually be solved in a reasonable amount of time for reasonable size inputs. Problems that cannot be solved in polynomial time are generally considered intractable or "hard" problems because as the size of the input representing the problem increases, solutions become computationally infeasible on even the fastest computers.

On the other hand, the class NP (which stands for non-deterministic polynomial) consists of all problems that are solvable in polynomial time on a nondeterministic TM, where "solvable" in this case does not have the usual meaning. A nondeterministic TM does not systematically solve a problem as does a deterministic TM, but instead guesses a solution (hence the term nondeterministic) and then checks its correctness. A given problem is said to be solvable in polynomial time on a nondeterministic TM if a nondeterministic TM can check the correctness of its guessed solution in polynomial time. Unfortunately, worst case times for systematically (deterministically) solving NP problems in the usual sense of the term are often exponential. The so-called "satisfiability" problem is an example of an NP problem which may be stated as follows: determine whether there exists an assignment of values to a set of n boolean variables such that a given set of constraints over the variables is met.

The class NP includes the class P because any problem solvable in polynomial time on a deterministic TM is also polynomial solvable on a nondeterministic TM. If all NP problems are polynomial solvable on a deterministic TM, then P=NP. Although many problems in NP seem much harder than the problems in P (e.g., satisfiability problems) no one has yet proven that P≠NP. Several decades ago, the satisfiability problem was proved to have the property that every other problem in NP can be reduced to it in polynomial time. This means that if the satisfiability problem is polynomial solvable, then every problem in NP is polynomial solvable, and if some problem in NP is intractable, then the satisfiability problem must also be intractable. Since 1971, other problems have been shown to be equivalent to the satisfiability problem. This set of equivalent problems is called the set of "NP-complete" problems, and has the property that if any one of the problems in that set is in P, then all NP problems are in P and P=NP. Thus, NP-complete problems are the hardest problems in NP (and are therefore sometimes also called NP-hard), or said another way, they set the upper bound on "hardness" for NP problems.

The fastest known algorithms for systematically solving these problems have worst case solution times that are exponential in the size n of the problem. Finding a worst-case polynomial-time solution to one of them would be a major breakthrough in computer science. However, despite the fact that the worst-case or upper-bound solve times for NP problems are exponential in n, in actual practice, solve times are often shorter than worst-case.

In summary, the general scheduling problem has been shown to be an NP-hard combinatorial optimization problem. A combinatorial optimization problem consists of finding, from among a finite set of alternatives, one that optimizes the value of a given objective function. Scheduling problems are satisfiability problems, and thus NP-hard problems too, because they seek to assign boolean values to requested events (i.e., decide whether they are scheduled or not) such that a given set of constraints are met. There remains a need for a method and device for finding an optimal solution to the multi-task scheduling problem in real time.

SUMMARY OF THE INVENTION

It is a first object of the invention to provide means for obtaining an optimal solution to a multi-task scheduling problem.

It is a further object of the invention to provide a method which may be used in a computer environment to find a solution to a multi-task scheduling problem.

It is another object of the invention to provide a computer readable medium bearing instructions which cause a computer system to provide an optimal solution to a scheduling problem.

It is yet a further objective of the invention to provide means for accomplishing the above objectives in minimal time.

The above objectives are met by applying artificial intelligence to partition or fragment a multi-task scheduling problem into a set of mathematically independent scheduling problems. An artificial intelligence "shell" then selects one of a plurality of algorithms, which will provide an optimal solution, in minimal time, for each individual scheduling sub-problem. The process is repeated for each sub-problem comprising the set of mathematically independent scheduling sub-problems. The individual solutions are then combined or defragmented to provide an optimal solution to the scheduling problem as a whole.

The features of the invention believed to be novel are set forth with particularity in the appended claims. However the invention itself, both as to organization and method of operation, together with further objects and advantages thereof may be best be understood by reference to the following description taken in conjunction with the accompanying drawings in which:

DESCRIPTION OF THE PREFERRED EMBODIMENTS

Figure 1:
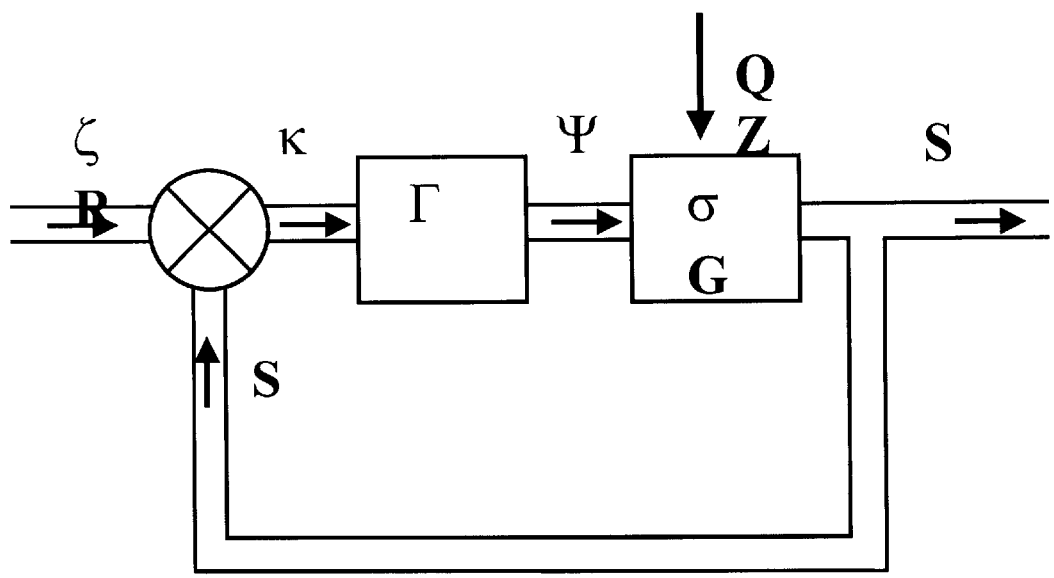
FIG. 1 is a diagrammatic representation illustrating the application of control theory for solving scheduling problems.

Artisans skilled in the art will appreciate the value of illustrating the present invention by means of example. Consider a system comprised of a plurality of satellites that communicate with a plurality of remote tracking stations ("RTS") or ground stations wherein there are far fewer ground stations than satellites. Further, since communications are "line-of-sight", a particular RTS can only communicate with a satellite during a window of time, the duration of which depends on the geographical siting of the RTS and the orbital dynamics of the satellite(s). An actual RTS may have more than one antenna ("side") and may communicate with more than one satellite simultaneously. For simplicity, the satellite utilization problem, presented herein as an exemplary application of the present invention for solving a complex scheduling problem, assumes that a single RTS site has only a single antenna. The RTS is said to "support" the satellites. A plurality of users place requests for satellite support with a global network of RTS's. The requests may require the invocation of a satellite function and/or downloading information acquired by the satellite in response to a previous instruction. Typical numbers for such a system are 100 satellites supported by 10 RTS's with 400 user support requests placed every 24 hour period. If the priority of the users placing the requests is identical, an optimal schedule will provide support for the largest number of support requests being granted and scheduled. The exemplary problem will be referred to as the satellite task scheduling problem ("STSP"). The STSP is presented as an exemplar of a generic scheduling problem and should not to be construed as limiting the scope of the invention.

As discussed earlier, satisfiability problems are NP-complete/hard and a generic scheduling problem (hereinafter "SP") is a satisfiability problem. However, the NP-hard nature of the SP (or any satisfiability problem) can be made worse (or better) depending on problem formulation, associated solution space size, and algorithm selection. The solution time grows exponentially with the number, m, of support requests to be satisfied. This means solution times grow (or shrink) very rapidly with increases (or decreases) in the number of satellite support requests—a key characteristic of the SP that both makes it difficult and is a clue to solving it in real-time.

The exemplary scheduling problem stated above (the "STSP"), like many scheduling problems, can be conceptually and operationally divided into three parts or activities: the planning sub-problem, the scheduling sub-problem, and the rescheduling sub-problem. In the STSP, the planning function is performed by satellite operators and results in the determination of satellite supports needed to meet mission requirements and the submission of these requirements by each operator, $\omega$, $\omega_i=1, 2, \ldots, \mu$, in the form of $\gamma_\omega$ satellite support requests, $\{q_{\lambda_\omega}\}$ to the schedulers in a document called a PAP. At the central scheduling function, all of the $q_{\lambda_\omega}$ are combined into an all encompassing set of support requests $Q_i$ where $i=1, 2, \ldots, m$ and $$m = \sum_{\omega=1}^{\mu} \lambda_\omega.$$

Typically, these satellite support requests contain a time-window when executing the requested support would be both spatially feasible, considering orbital mechanics and the geographic locations of the respective RTS's, and operationally permissable, considering satellite system maintenance and mission requirements. The requests also specify the duration of the support, and the RTS's that are both visible to the satellite during the specified contact window and suitable for operational reasons. The permissable alternative RTS sites for each satellite support request can be defined by "alternative sites" parameters, $A_{ij}$, such that if site j is permitted for scheduling satellite support i, then $A_{ij}=1$ and if not, $A_{ij}=0$. It is descriptive and useful to refer to the planning part of the "global" STSP as the Requirements Generation Problem (RGP).

Once the satellite support requests are submitted to the schedulers via PAP's, the Requirements Satisfaction Problem (RSP), or the scheduling problem per se, begins. The RSP can be formally described as a mathematical optimization problem. This type of descriptive formalism is particularly well suited for comparisons with other mathematical optimization problems in the literature. Although the formalism presented below consists of all-linear relations in terms of its variables, the formalism does not require this, and is capable of incorporating non-linear constraints and objectives, as well. However, a linear formalism has the benefit of being directly translatable into a mixed integer programming ("MIP") algorithm formulation that, along with other algorithms, is employed in the practice of the present invention and will be described below. For the RSP, the task is to produce a feasible schedule $S_{ij}$ based on a set of daily satellite support requests, $Q_i$, i=1, 2, ..., m, to be executed by RTS site j, j=1, 2, ..., n, that maximize an objective (or value, or utility) function $Z_1$ subject to set of constraints:

$$\text{Maximize: } Z_i = \sum_{i=1}^{m} \sum_{j=1}^{n} P_{ij} S_{ij} \tag{3}$$

Subject to:

$$\sum_{j=1}^{n} S_{ij} \leq 1 \quad \forall i \tag{4}$$

$$T_{ij} \geq B_{ij} S_{ij} \forall i,j \tag{5}$$

$$T_{ij} \leq (E_{ij} - D_i) S_{ij} \forall i,j \tag{6}$$

$$T_{ij} + D_i + U_{hj} \leq T_{hj} + M Y_{ihj} + M(1-S_{ij}) + M(1-S_{hj}) \forall h,i,j \tag{7}$$

$$T_{hj} + D_h + U_{ij} \leq T_{ij} + M(1-Y_{ihj}) + M(1-S_{ij}) + M(1-S_{hj}) \forall h,i,j \tag{8}$$

$$S_{ij} \in \{0, 1\} \forall h,i,j \tag{9}$$

$$T_{ij} \geq 0 \forall i,j \tag{10}$$

$$Y_{ihj} \in \{0, 1\} \forall h,i,j \tag{11}$$

where h=1, 2, ..., m, but h≠i. In (3)–(11), the decision variables, that is, those variables that are outputs of a solution algorithm, are denoted by boldface type. Relations (3)–(11) are explained below:

Parameters—the $P_{ij}$ are priority parameters, the $B_{ij}$ are begin support window parameters, the $E_{ij}$ are end support window parameters, the $D_i$ are support duration parameters, the $U_i$ are RTS support set-up time parameters, and M is a large positive constant.

Variables—the $S_{ij}$ are the "schedule" decision variables, the $T_{ij}$ are the support start time decision variables, and the $Y_{ihj}$ are artificial "either-or" variables.

Relation (9) indicates that the schedule decision variable $S_{ij}$ is boolean or binary. If satellite support request i is scheduled at RTS site j, then $S_{ij}=1$, otherwise $S_{ij}=0$.

Relation (10) indicates that the scheduled satellite support start time decision variable, $T_{ij}$, for satellite support i on RTS site j, is a non-negative real number.

Relation (11) indicates that the artificial variable $Y_{ihj}$ is boolean. Its specific function is addressed in the explanations of (7) and (8).

Relation (3) is a so-called objective function; that is, the function that must be maximized to "solve" the RSP or to reach "the objective" of the RSP. Alternative objective functions are possible and are discussed below. In (3), each $P_i$ represents a weight associated with request $Q_i$. If all $P_i$ are equal, then (3) maximizes the number of $Q_i$ that are scheduled. If all $P_i$ are not equal, then (3) maximizes the number of $Q_i$ scheduled weighted by $P_i$. Therefore, conceptually and operationally, the set $\{P_i\}$ constitutes a priority or importance vector and each $P_i$ is a priority parameter. If a particular satellite support request, say $Q_1$, were assigned a priority parameter, $P_1=3$, and it conflicted with two other non-conflicting requests, $Q_2$ and $Q_3$, with priority parameters $P_1=1$ and $P_2=1$, then (3) says that $Q_1$ should be scheduled, $S_{1j}=1$, and $Q_2$ and $Q_3$ should not be, $S_{2j}=S_{3j}=0$.

Relation (4) is a constraint that ensures that each satellite support request, $Q_i$, is scheduled at no more than one RTS site, j.

Relation (5) requires the start time, $T_{ij}$, for each scheduled satellite support (i.e., $S_{ij}=1$) to be at or after the beginning, $B_i$, of its requested time window. For satellite support requests that are not scheduled ($S_{ij}=0$), this constraint only requires $T_{ij} \geq 0$.

Relation (6) requires the start time, $T_{ij}$, for each scheduled satellite support ($S_{ij}=1$) to be no later than the end, $E_i$, of its requested time window minus the duration, $D_i$, of the satellite support. This ensures the each scheduled support is completed prior to the end, $E_i$, of the requested time window. For satellite support requests that cannot be scheduled ($S_{ij}=0$), this constraint requires $T_{ij} \leq 0$. Together, (5) and (6) ensure that each scheduled satellite support ($S_{ij}=1$) is completed within the requested time window. Relations (5) and (6) together also force $T_{ij}=0$ for satellite support requests that are not scheduled ($S_{ij}=0$).

Relations (7) and (8), ensure that the scheduled satellite supports ($S_{ij}=1$) performed by a given RTS site j do not overlap in time. In (7) and (8), the artificial boolean $Y_{ihj}$ variables are used in a standard mathematical programming technique to instantiate "either-or" constraints. The so-called "big M" in (7) and (8) is a large positive constant. Relation (7) is a constraint that is binding or operative only if $Y_{ihj}=0$, $S_{ij}=1$, and $S_{hj}=1$; in other words only if both $Q_i$ and $Q_h$ are scheduled at RTS site j, where i≠h, and $Y_{ihj}=0$. In this case, (7) constrains the sum of the start time, $T_{ij}$, for satellite support i on RTS site j, the duration, $D_i$, of support i, and the setup time, $U_h$ for support h, to be less than the start time, $T_{hj}$, for satellite support h at RTS site j, since all of the other right-hand-side terms are zero. This ensures that scheduled satellite support $S_{ij}$ is completed before setup for and start of scheduled support $S_{hj}$. On the other hand, if either $S_{ij}=0$, $S_{hj}=0$, or $Y_{ihj}=1$, then the right hand side of (7) contains a large number M that will always be larger than the left-hand side of (7), making the constraint non-binding/inoperative. In other words, if either $Q_i$ or $Q_h$ are not scheduled at RTS site j, then there is no reason to ensure that the temporal relationships between $T_{ij}$, $T_{hj}$, $D_i$, and $U_h$ are such that $S_{ij}$ and $S_{hj}$ do not overlap.

Relation (8) is analogous to (7). Again, if either $S_{hj}=0$, or $S_{ij}=0$, for given j and arbitrary h and i (except that h≠i), then the right-hand-side of (8) has a big M and the constraint is nonbinding/inoperative. However, due to the M $(1-Y_{ihj})$ term on its right-hand-side, (8) is also non-binding if the $Y_{ihj}=0$, the opposite of the relation (7) case for $Y_{ihj}$. Since $Y_{ihj}$ is boolean and must equal either 0 or 1, when (7) is binding/operative, (8) is not and vice versa (this is what is meant by either-or constraint). As with (7), when (8) is binding, it ensures that scheduled satellite support $S_{hj}$ is completed before setup for and start of scheduled satellite support $S_{ij}$. Thus, the objective function maximizing values of the boolean $Y_{ihj}$ variables are determined through the interaction of (3), (7), and (8).

Another important feature of the RSP is the potential conflict between satellite support request i, i=1, 2, ..., m and satellite support request h, h=1, 2, ..., m, $h \neq i$, defined as:

$$X_{ih} = \begin{cases} 1 & \text{if } B_{hj} - U_{hj} \leq E_{ij} \leq E_{hj} \text{ and } A_{ij} + A_{hj} = 2 \\ 1 & \text{if } B_{hj} \leq B_{ij} - U_{ij} \leq E_{hj} \text{ and } A_{ij} + A_{hj} = 2 \\ 0 & \text{otherwise} \end{cases} \quad (12)$$

The total amount or order of the potential conflict associated with a given support request, i, is just:

$$X_i = \sum_{h=1}^{m} X_{ih} \quad h \neq i \quad (13)$$

The amount of actual conflict between two scheduled satellite supports is defined as:

$$c_{ih} = \begin{cases} 1 & \text{if } T_{ij} + D_i > T_{hj} - U_{hj} \text{ and } S_{ij} + S_{hj} = 2 \\ 1 & \text{if } T_{hj} + D_h > T_{ij} - U_{ij} \text{ and } S_{ij} + S_{hj} = 2 \\ 0 & \text{otherwise} \end{cases} \quad (14)$$

for all i=1, 2, ..., m; h=1, 2, ..., m, but $h \neq i$; j=1, 2, ..., n. The conflict associated with a single scheduled support i is given by:

$$c_i = \sum_{h=1}^{m} c_{ih} \quad h \neq i \quad (15)$$

The total conflict in an entire schedule $S_{ij}$ i=1, 2, ..., m and j=1, 2, ..., n is then just:

$$C = \sum_{i=1}^{m} \sum_{h=1}^{m} c_{ih} = \sum_{i=1}^{m} c_i \forall i, h; i \neq h \quad (16)$$

There are two interesting observations regarding relations (12)–(16):

First, if $X_{ih}=0$, then $c_{ih}=0$. That is, if there is no potential conflict between requested satellite supports i and h, then there will be no actual conflict when they are scheduled, no matter when or at what side they are scheduled (assuming they are scheduled within their support windows at only one of their permissable sites). Second, the descriptive formalism drives all $c_{ih}=0$ through relations (7) and (8), so that if implemented in some algorithm (say a MIP), it produces a conflict free schedule while maximizing the number of priority-weighted supports scheduled (or one of the other objective functions discussed below).

Relations (3)–(16) constitute the basic RSP descriptive formalism. A strength of the formalism is that, with a little ingenuity, many variations and embellishments are possible. For example, some would argue for a different objective function. Another that has been suggested is "maximizing throughput" or "utilization". Relation (17) below is such an objective function:

$$\text{Maximize: } Z_1 = \sum_{i=1}^{m} \sum_{j=1}^{n} D_i S_{ij} \quad (17)$$

where $D_i$ is the duration of satellite support i. This objective function maximizes the total utilization of the network of RTS's. Like (3), this objective function can also be viewed as weighting the scheduled supports $S_{ij}$, but by duration, $D_i$, rather than by priority or importance, $P_i$. However, both types of weighting can be accommodated simultaneously in the formalism:

$$\text{Maximize: } Z_1 = \sum_{i=1}^{m} \sum_{j=1}^{n} P_i D_i S_{ij} \quad (18)$$

wherein weightings are a multiplicative combination of priority and duration.

One objection to (17) is that long-duration satellite supports are favored over shorter duration supports for scheduling, which in turn results in medium/high altitude satellite supports being favored over low-altitude satellite supports for scheduling, since the former are, on average, much longer than the latter. This is the opposite of current manual scheduling practice, where de facto priority is given to scheduling low-altitude satellite support requests because low satellites generally have shorter and less numerous RTS visibility opportunities when compared to medium/high altitude satellites. On the other hand, (3) gives equal weight to low and medium/high altitude satellite support requests, unless the $P_i$'s are used to favor a particular satellite altitude class. One compromise between (3) and (18) is:

$$\text{Maximize: } Z_1 = \sum_{i=1}^{a} \sum_{j=1}^{n} P_i S_{ij} + \sum_{i=a+1}^{m} \sum_{j=1}^{n} P_i D_i S_{ij} \quad (19)$$

where satellite supports i=1, 2, ..., a are low altitude supports; i=a+1, a+2, ..., m are medium/high altitude supports; and $\min(\{P_i\}, i=1, 2, ..., a) >> (\max\{P_i D_i\}, i=a+1, a+2, ..., m)$. This objective function gives priority to maximizing the number of $P_i$-weighted low altitude supports scheduled, and then maximizes the utilization of the satellite control network for the remaining medium/high altitude supports. Regardless of whether the objective function is given by (3), (17), (18), or (19), the rest of the descriptive formalism contained in (4)–(16) remains unchanged.

The descriptive formalism can be modified to accommodate additional, potential aspects of the RSP. Suppose, for example that an emergency or some other absolute priority operational situation requires that a particular satellite support, for example, support 1, be preemptively scheduled, (i.e., $S_{ij}=1$) no matter what other support requests were extant. There are two ways to include this preemptive support in the RSP descriptive formalism. One is by adding a preemptive constraint to the constraint set given by (4)–(11):

$$\sum_{j=1}^{n} S_{1j} = 1 \quad (20)$$

However, although simple and direct, (20) has a significant drawback. With many algorithms, particularly mathematical programming algorithms such as linear programming (LP) and MIP, if (20) is not feasible for some reason then the algorithm fails and no solution (i.e., schedule) is produced.

A better way to include a preemptive satellite support in the descriptive formalism that avoids this problem, is through the objective function, by assigning a preemptive value to the support's priority parameter; i.e., $P_1 \gg P_k$, k=2, . . . , m. This ensures that if at all possible, $S_{1j}=1$ (or $S_{11}=1$), but if not possible, $S_{1j}=0$ (or $S_{11}=0$), and the rest of the schedule, $S_{kj}$, k=2, 3, . . . , m, (or $S_{kr}$, k=2, 3, . . . , m; r=2, 3, . . . , n) is still produced.

RTS site downtimes are another important aspect of the STSP exemplary scheduling problem that is easily captured in the formalism. Downtimes, which may be necessary in order to facilitate repairs to a RTS, can be incorporated into the formalism as another set of either-or constraints; i.e.:

$$T_{ij}+D_i \leq F_j+MX_{ij}+M(1-S_{ij}) \quad (21)$$

$$T_{ij} \geq G_j+U_i+M(1-X_{ij})-M(1-S_{ij}) \quad (22)$$

where the $F_j$ and $G_j$ are start downtime and stop downtime parameters respectively, and the $X_{ij}$ are artificial binary variables that implement the either-or nature of the constraints. A simpler way to incorporate RTS site downtimes into the formalism is to treat them as preemptive supports. In this case, one or more of the m support requests, $Q_i$, are downtimes and may be incorporated into the formalism either as a preemptive constraint as in (20) or through the objective function by assigning it a preemptive priority parameter.

In addition to automated satellite support scheduling, it is desirable that the descriptive formalism and ASP algorithms also be applicable to the third sub-problem of the STSP—the rescheduling problem (RP); i.e., the problem of inserting one or more preemptive supports into an already generated (and perhaps partially executed) schedule in real-time. Such preemptive insertion, if not handled carefully, can strongly disrupt the original agreed upon, published, and planned for schedule. Generally, the objective in rescheduling is to minimize the impact on the original published schedule while including the preemptive supports in the new schedule. In this case, neither relation (3) (maximizing priority weighted supports scheduled), relation (18) (maximizing RTS utilization), nor relation (19) (maximizing low altitude satellite supports scheduled and medium/high altitude satellite utilization), are satisfactory. A new objective function for the rescheduling part of the descriptive formalism is needed:

Minimize:

$$Z_2 = \sum_{i'=1}^{m'} \sum_{j \in RTSi} P_{i'j}(([S_{i'j}])_1 - R_{i'j}) - \quad (23)$$

$$\alpha \sum_{i'=m'+1}^{m} \sum_{j \in RTSi} P_{i'j}(R_{i'j} - ([S_{i'j}])_0) - L \sum_{i'=m+1}^{m+f} \sum_{j \in RTSi} R_{i'j}$$

where $[S_{i'j}]_1$ are the originally requested satellite supports that are in the initial schedule (i.e., for which $S_{ij}=1$), reindexed from i'=1, 2, . . . , m'; m' is the number of the original $S_{ij}$'s that equal 1; the $P_{i'j}$ in the first double summation are the priority parameters associated with the original $S_{ij}$'s that equal 1; the $R_{i'j}$ are the rescheduled satellite support decision variables such that if satellite support request i' is in the reschedule, $R_{i'j}=1$, and if it's not, $R_{i'j}=0$; $\alpha$ is a parameter such that $0<\alpha<1$; $[S_{i'j}]_0$ are the m-m'-1 originally requested satellite supports that were not scheduled in the initial schedule (i.e., for which $S_{ij}=0$), reindexed from i'=m'+1, m'+2, . . . , m; M is a very large positive constant; and f=1, 2 . . . is the number of new preemptive satellite supports. However, since all of the $[S_{i'j}]_0=0$, the $[S_{i'j}]_0$ term can be omitted from (23) leaving the objective function (24):

$$\text{Minimize: } Z_2 = \sum_{i'=1}^{m'} \sum_{j \in RTSi} P_{i'j}(([S_{i'j}])_1 - R_{i'j}) - \quad (24)$$

$$\alpha \sum_{i'=m'+1}^{m} \sum_{j \in RTSi} P_{i'j}R_{i'j} - L \sum_{i'=m+1}^{m+f} \sum_{j \in RTSi} R_{i'j}$$

The objective function in (24) requires some explanation. In the first double summation term, by definition all of the $[S_{i'j}]_1=1$, and the $R_{i'j}=0$ or $R_{i'j}=1$. Minimizing $Z_1$ requires that the $R_{i'j}=1$ as often as possible in this term, making the corresponding $P_{i'j}$ ($[S_{i'j}]_1-R_{i'j}$)=0. Where $R_{i'j}=0$ in this term, indicating that the satellite support $[S_{i'j}]_1$ is descheduled, the corresponding $P_{i'j}$ ($[S_{i'j}]_1-R_{i'j}$)=$P_{i'j}$. This means that the objective function penalty for descheduling an originally scheduled satellite support is equal to it's priority parameter, $P_{i'j}$; i.e., the higher the priority of a descheduled support, the greater the objective function penalty—just the desired effect.

The second double summation term takes into account the possibility that rescheduling will result in scheduling satellite supports that were requested but not scheduled in the original schedule (i.e., $S_{ij}=0$ or $[S_{i'j}]_0$). Since the second double summation term is negative definite, it provides an objective function reward in contradistinction to the objective function penalty of the first term. The objective function reward for scheduling any of the originally unscheduled $[S_{i'j}]_0$ so that $R_{i'j}=1$ for m'+1≤i'≤m, is just $-\alpha P_{i'j}$. Scheduling an originally unscheduled satellite support, as long as it doesn't result in the descheduling of an originally scheduled support, is rewarded by the amount $-\alpha P_{i'j}$. On the other hand, descheduling any of the originally scheduled $[S_{i'j}]_1$ so that $R_{i'j}=0$ for 1≤i'≤m', in order to schedule any of the original $[S_{i'j}]_0$ of equal priority so that $R_{i'j}=1$ for m'+1≤i'≤m, is prevented because there is a more than offsetting penalty in the first double summation term equal to $P_{i'j}$, resulting in a net penalty of $(P_{i'j}-\alpha P_{i'j})$ or $(1-\alpha)$ $P_{i'j}$ across both double summation terms. In the case of unequal priorities, say $P_{aj}$ and $P_{bj}$, associated with descheduling ($R_{aj}=0$) and scheduling ($R_{bj}=1$) previously unscheduled supports respectively, the penalty/reward is given by $(P_{aj}-\alpha P_{bj})$. Thus, if $P_{aj}>\alpha P_{bj}$, the objective function is penalized by $(P_{aj}-\alpha P_{bj})$ and scheduling such that $R_{bj}=1$ and descheduling such that $R_{aj}=0$ is prevented, whereas if $P_{aj}<\alpha P_{bj}$, the objective function is rewarded by $(P_{aj}-\alpha P_{bj})$ and both, all else being equal, will occur. If $P_{aj}=\alpha P_{bj}$, then the objective function (24) is indifferent to the descheduled/scheduled pair. If the insertion parameter $\alpha=1$, then this indifference applies to equal priority satellite supports, $P_{aj}=P_{bj}$, which is undesirable since indifferent scheduling of originally unscheduled supports, displacing originally scheduled supports of equal priority, is not compatible with the rescheduling problem goal of minimizing scheduling turbulence or impacts. This is the reason for choosing α such that 0<α<1. The third double summation term addresses the f new preemptively scheduled satellite supports, $R_{i'j}$, i'=m+1, m+2, . . . , m+f. L is a large positive constant that ensures that all of the $R_{i'j}$=1 in this term.

The constraint set associated with (24) and the STSP rescheduling problem is basically analogous to (4)–(11) with appropriate reindexing:
Subject to:

$$\sum_{j=1}^{n} R_{i'j} \leq 1 \quad \forall \, i' \tag{25}$$

$$T_{i'j} \geq B_{i'j} R_{i'j} \forall i',j \tag{26}$$

$$T_{i'j} \leq (E_{ij} - D_i) R_{i'j} \forall i',j \tag{27}$$

$$T_{i'j} + D_{i'} + U_{h'} \leq T_{h'j} + MY_{i'h'j} + M(1-R_{i'j}) + M(1-R_{h'j}) \forall h',i' \tag{28}$$

$$T_{h'j} + D_{h'} + U_{i'} \leq T_{i'j} + M(1-Y_{i'h'j}) + M(1-R_{i'j}) + M(1-R_{h'j}) \forall h',i' \tag{29}$$

$$R_{i'j} \in \{0, 1\} \forall h',i',j \tag{30}$$

$$Y_{i'h'j} \in \{0, 1\} \forall h',i',j \tag{31}$$

$$T_{i'j} \geq 0 \forall i, \forall j \tag{32}$$

where i'=1, 2, . . . , m+f; and h'=1, 2, . . . , m+f, but h'≠i'.

The present inventors have investigated many intrinsically different algorithms for application to scheduling problems, including the STSP, and have fully developed three of these algorithms for optimized scheduling problem solution: mixed integer programming (MIP), genetic algorithms (GA) and control theory (CT). In addition to these three main solution algorithms, the present inventors have developed two original heuristic algorithms that have proven invaluable in combination with other algorithms in a hybrid approach to solving scheduling problems. These heuristic algorithms are not of the expert system type—that is, they do not reflect current human scheduling practices or rules-of-thumb. Rather, they are based on mathematical logic and rule-based decision-making. The hybrid algorithm also incorporates the idea of a priority parameter (as introduced in the STSP Descriptive Formalism), that permits, but does not require, human intervention in the scheduling process.

Algorithms Used for Resolving Scheduling Problems
1. Mixed Integer Programming (MIP)

MIP's are a variation of linear programs (LP's) where some of the decision (i.e., dependent or output) variables are constrained to integer values and the rest are ordinary continuous variables. MIP is well-known, well-understood methodology for optimizing a linear objective function subject to linear constraints. High performance, state-of-the-art commercial solvers are available to solve LP's/MIP's once formulated. The solution algorithms they implement, including simplex, revised simplex, interior point, branch and bound, and cutting plane algorithms are the subject of numerous scholarly mathematical programming and operations research publications. Solution times for MIP's using given solver software and computer hardware tend to be exponential in the number of integer variables in the MIP formulation.

A MIP formulation for a given scheduling problem, vis a vis other solution algorithms, has the advantage of guaranteeing a mathematically optimal solution in terms of the MIP objective function while meeting all MIP constraints. Of course, whether the solution produced by a MIP is in reality "optimal" depends on whether linear objective functions and constraints can be devised that satisfactorily capture the salient aspects of the given scheduling problem. Since MIP solutions are mathematically optimal, a MIP may be a preferred algorithm for solving the complex scheduling problems, but only if the solution can be derived in "real-time" (real-time being generally regarded as <10 minutes for time sensitive scheduling problems). Even if MIP solution times for a scheduling problem do not meet the real-time standard, a non-real-time MIP solution is still valuable as an optimality benchmark for other solution algorithms. Relations (3)–(16) of the STSP Descriptive Formalism constitute the basic MIP representation of the STSP. These have been implemented by the present inventors in the General Algebraic Modeling System (GAMS™) modeling language. The GAMS™ code calls one of the fastest commercial solvers available, the CPLEX™ solver by ILOG, to solve part of the STSP.

2. Genetic Algorithms (GA)

GA's originated in the Artificial Intelligence (AI) community. GA's are a class of biologically inspired algorithms that are often used for optimization, or finding a maximum (minimum) of some complex function. In GA's, a "chromosome" is a particular instantiation of all of a problem's dependent variables (e.g., whether or not to schedule a particular RTS side to provide a particular support to a particular satellite at a particular time). Each variable within the chromosome is a "gene" consisting of this information. GA's then: (a) randomly generate a population of chromosomes for the problem, (b) measure the "fitness" of each chromosome according to some criterion, (c) generate a new set of chromosomes from the "best" of the previous generation (as measured by the fitness criterion) by two methods, (d) perform "mutation"—randomly change some of the values of the chromosomes' dependent variables, (e) perform "mating"—trade some dependent variable values between two "parent" chromosomes, (f) iterate until new chromosomes no longer improve fitness.

It is presumed that the answer provided through this process is optimal, but in fact GA's often converge to a local optimum. The major aspects of a GA by which an experimenter can control suboptimal convergence are: (a) initial and subsequent chromosome population sizes, mating (also called "crossover") rules, mutation rules. GA's tend to find robust solutions to problems rather than "spikes" and are relatively easy to implement. Additionally, GA's have the property that the closer the initial GA chromosome set is to an optimum solution, the faster it converges to the "optimal" chromosome.

The so-called Schema Theorem explains why GA's work. In a GA, individual chromosomes reproduce and therefore increase in proportion to their fitness as determined by a fitness measure or objective function. The Schema Theorem basically asserts that because of this, the genes (or schema) associated with individual chromosomes of above average fitness tend to increase exponentially, whereas the genes associated with individual chromosomes of below average fitness tend to occur less and less often in succeeding generations of chromosomes.

The present inventors developed a specialized genetic algorithm for solving the scheduling problem. This GA was developed based on the philosophical view that all scheduling problems are sequencing problems. By optimizing the sequence of processes or events, optimization across the entire problem domain can be achieved. The fundamental insight that underpins the view that scheduling problems are sequencing problems is: if an optimal scheduling solution exists, it will have a sequence of what is being scheduled associated with it that could be called the optimal sequence. If the optimal sequence is determined, then the optimal schedule will flow from it.

In the sequencing representation of a given scheduling problem, a gene is used to represent the sequence in which a simple heuristic algorithm (or schedule builder) inserts each support request into a schedule. Therefore, the number of genes in a scheduling-as-sequencing GA chromosome equals the number of support requests. The schedule builder heuristic searches for a conflict-free position in the schedule given the sequence provided by the genes. Some task preferences can be accommodated by the schedule builder heuristic at this point, such as scheduling events as soon as possible or as late as possible within the allowed time window.

The GA currently uses relation (3) as its fitness function, although any of the alternative objective functions of the descriptive formalism could be used just as easily. Thus, within the GA, the priority parameter, $P_i$, is used to ensure that higher priority supports are scheduled when conflicts occur. In accordance with the Schema Theorem, those that achieve the better measure of fitness more strongly affect the next cycle (generation) of schedules generated. In extensive testing, the GA has demonstrated exceptional computational speed and final solution optimality for a wide range of scheduling problems, including the STSP.

3. Control Theory

Control Theory (CT) addresses the problem of keeping the state $S(t)$ of a system at time or iteration t at a certain value or within an allowable range of values or alternatively, moving the state of a system from an initial state at time or iteration $t_0$ (i.e., $S(t_0)$) to a desired state at time or iteration $t_f$ (i.e., $S(t_f)$). Control theory attempts to solve this problem by finding a control "law" or control vector $\Psi(t)$ such that when it is applied to the initial state vector $S(t_0)$, it moves the system to new state vector $S(t_f)$. In equation form:

$$S(t+1) = \sigma[S(t), \Psi(t)] \qquad (32)$$

where $S(t)$ is the state vector and $\sigma$ is a function vector that is generally nonlinear. If a desired state for the scheduling problem can be specified, then CT could be used in moving to and maintaining this desired scheduling state. FIG. 1 illustrates one possible way to conceptualize the STSP exemplary scheduling problem using CT—in this case, as a servomechanism problem. In FIG. 1, ζ is a so-called reference vector that, in the STSP problem would represent the desired amount of conflict in the final schedule state; i.e., ζ=0. S is the actual schedule produced by the STSP scheduling system σ, κ is the conflict vector that measures the difference between the ζ and the conflict C inherent in the latest iteration of S (and because ζ=0, κ=C). Γ is the compensator which produces the control vector $\Psi$ that is an input to the scheduler σ that produces the schedule S. The request vector, Q, represents all factors beyond the control of the scheduler, including the satellite support requests, that cause the produced schedule to deviate from optimum and require compensation.

Based on a control-theory approach, the present inventors developed the following algorithm for maximizing the number of prioritized satellite support requests scheduled for the exemplary STSP (but is applicable to any task and resource scheduling problem with a change in terms):

(a) Order requested supports based on earliest begin support window time $B_{ij}$.

(b) Tentatively schedule each request randomly among its permissable RTS sites.

(c) Calculate $P_i$ $c_i$ (using relation (14) for $c_i$) for each tentatively scheduled support, i=1, 2, . . . , m.

(d) For all tentatively scheduled supports with $c_i>0$, calculate new $P_i$ $c_i$ if a support is tentatively scheduled at its current site, but shifted in its permitted time window so as to minimize $P_i$ $c_i$. Then calculate new $P_i$ $c_i$ if a support is tentatively scheduled at each of its other permissable sides, shifted in its permitted time window so as to minimize $P_i$ $c_i$.

(e) Tentatively reschedule each support with $c_i>0$ at the site and support time window position from step 4 that minimizes $P_i$ $c_i$.

(f) Repeat steps 3–5 until all $\Delta P_i c_i \geqq 0$ for all tentatively scheduled supports.

(g) For every set of tentatively scheduled supports that are conflicting with each other; i.e., where $c_{ih}=1$, tentatively deschedule each such support one at a time and calculate $c_i/P_i$ associated with each tentative descheduling.

(h) For each set of tentatively scheduled supports that are conflicting as in 7, deschedule the support that thereby produces the smallest value for $$\sum_{i=1}^{m} c_i / P_i.$$

(i) Repeat steps 7 and 8 until all tentatively scheduled supports have $c_i=0$. This is the final schedule.

With all $P_i$ equal, the algorithm moves supports one at a time to a permissable RTS site and within the support time window so as to minimize conflict. When no more conflict reduction can be achieved by such movements, the algorithm deschedules those supports that thereby reduce conflict the most until all conflict has been removed from the schedule.

The introduction of heterogeneous $P_i$ complicates the interpretation of the algorithm somewhat. Steps (c)–(f) move supports one at a time to a permissable RTS site and within the support time window so as to minimize priority-weighted conflict, $P_i$ $c_i$. This has the effect of preferentially reducing conflicts associated with higher priority supports which is desirable. When no more priority-weighted conflict reduction can be achieved by such movements, steps (g) and (h) deschedule those supports that produce the largest reduction in $$\sum_{i=1}^{m} c_i / P_i.$$

Essentially, these steps ensure that high priority supports are preferentially maintained in the schedule and that low priority supports are preferentially descheduled until all conflict has been removed from the schedule.

4. Heuristic Algorithms

Based on experience in developing and testing the "main" scheduling algorithms, (i.e., MIP, GA and CT), the present inventors came to realize that two heuristic algorithms could contribute to solving the STSP, and other scheduling problems, quickly. The first such algorithm, the Low-Order Conflict Resolution Filter (LOCRF), is based on relations (12) and (13). As already noted, if a given satellite support has no potential conflict ($X_{ih}=0$, $\forall h \neq i$), then no actual conflict will exist when the support is scheduled within in its support time window at one of its permissable RTS sites. The LOCRF heuristic consists of the following steps:

(a) Search the entire list of requested satellite supports for supports where $P_i X_{ih}=0$, $\forall h \neq i$; then schedule those supports.

(b) Search for cases where two requested supports have potential conflict with each other, but with no other supports. If found, then check to see if the potential conflict between the two supports can be resolved by moving one or both within their support time windows or by scheduling each at a different permissable site. If so, schedule the one with greatest $P_i$ and return to step (a). If not, go to step (c).

(c) Search for cases where three requested supports have potential conflict with each other, but with no other supports. If found, then check to see if the potential conflict for one or more of the supports can be resolved by moving one or more within their support time windows or by scheduling one or more at a particular permissable site. If so, schedule the one with greatest $P_i$ and return to step (a). If not, go to step (d).

(d) Search for cases where four requested supports have potential conflict with each other, but with no other supports. If found, then check to see if the potential conflict for one or more of the supports can be resolved by moving one or more within their support time windows or by scheduling one or more at a particular permissable site. If so, schedule the one with greatest $P_i$ and return to step (a). If not, end.

LOCRF is low-order because it seeks to find and resolve potential conflicts between at most 4 requested supports. A fifth order LOCRF was actually developed and tested, but its results did not improve on the fourth order LOCRF results, and it took substantially longer to execute. LOCRF is a fast algorithm (2–4 seconds for 400 support requests) that generally optimally schedules a significant fraction (10–30%) of the support requests presented to it. Although it is not suitable for finding an optimal solution for the entire STSP by itself, it is valuable when used as a pre-processing algorithm before invoking the final solution algorithms: MIP, GA, or CT. LOCRF is designed to reduce the problem size presented to the final solution algorithms without affecting the optimality of the final schedule. LOCRF schedules its 2, 3, or 4 support sub-problems the same way the MIP would; i.e., the LOCRF steps enforce the relations (3)–(11) just as the MIP does.

The second heuristic developed by the present inventors, and which, together with the first heuristic algorithm, LOCRF, is a key feature of the present invention, is the High Order Conflict Partition (HICOP). HICOP is "high-order" because it is used on the STSP support request database after LOCRF has resolved the low-order potential conflicts. If the STSP can be separated or partitioned into a set of smaller sub-problems that, when solved and combined, will yield the same optimal solution as obtained by applying the "main" optimizing algorithms to schedule the STSP as a whole, then because of computational complexity theory, the solution to the STSP may be found much more quickly than attacking the STSP as a whole. For example, because the STSP is a combinatorial optimization problem, its worst case solution time is $O(n!)$ where n is the number of support requests in the STSP. If divided into two equal parts, the worst case solution time is $O((n/2)!)$ for each or $2\ O((n/2)!) < O(n!)$ $\forall n>3$. Although in reality two equal parts is rarely the result of HICOP application, any successful partitioning significantly reduces total problem solution time.

HICOP identifies separable partitions within an STSP in the following way:

(a) Two given supports i and h are said to be simple entangled if $X_{ih} \neq 0$.

(b) For the first partition, i.e., $\rho=1$, starting with support request i=1, make a list of all other supports h=2, 3, ..., m with which support request 1 is simple entangled. Designate this list of simple entanglements for partition 1 and support request 1, $\{\Lambda_{11}\}$.

(c) For each support request in $\{\Lambda_{11}\}$, make a list of all other supports that are simple entangled with it and designate each list so generated by a properly subscripted $\{\Lambda_{1i}\}$.

(d) Continue to build $\Lambda_{1i}$ in this manner until there are no more new simple entanglements.

(e) Merge all supports in the first partition (i.e., the $\Lambda_{1i}$) into a superset $\Pi_1$. The members of $\Pi_1$ that are not simple entangled are said to be complex entangled.

(f) For the second partition, start with the first support request after request 1 that is not in $\Pi_1$ and execute steps (b)–(f), incrementing the partition index by one each time through the algorithm until all support requests are in a partition.

These HICOP steps place a given support request in one and only one partition or sub-set. The resultant partitions are separable or independent in the sense that they have no support request in common and none of their support requests are simple or complex entangled with support requests in other partitions. Thus, no scheduling action taken relative to a support request in one partition can affect scheduling actions in any other partition. Once HICOP has divided an STSP into partitions, any of the "main" optimizing algorithms (MIP, GA, CT) can be brought to bear on the resultant subproblems. To the extent that HICOP generates multiple STSP subproblems, it has the added benefit of making the final STSP solution parallelizable. Therefore, the ultimate achievable STSP solve time is equal to the solve time for the largest partition generated by HICOP plus the LOCRF and HICOP solve times. HICOP itself is extremely fast—it generates partitions for a 400 support request STSP in seconds on a high-end Pentium II.

6. Hybrid Algorithm

Figure 2:
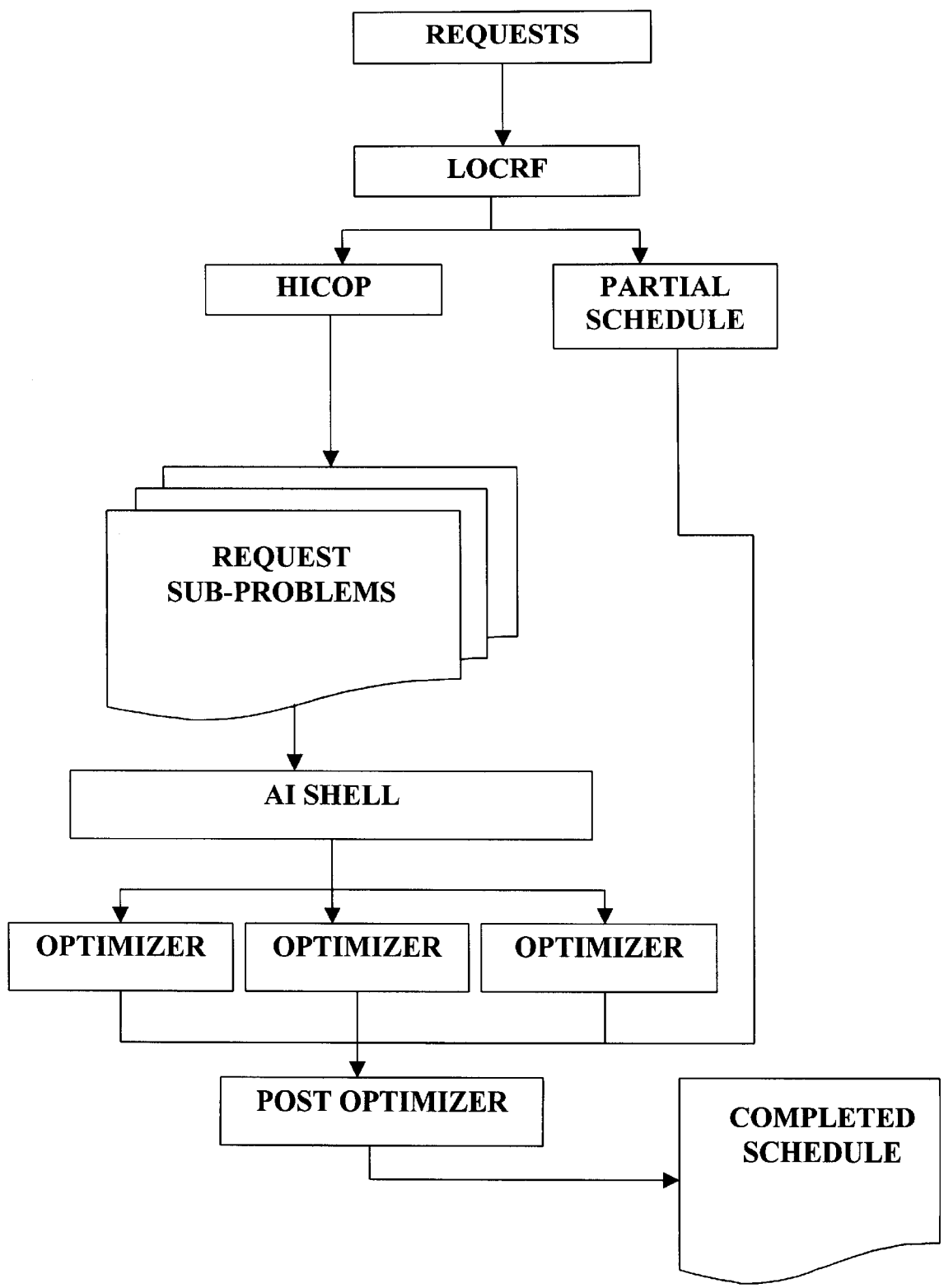
FIG. 2 illustrates a hybrid algorithm used to solve complex scheduling problems in accordance with the method of the present invention.

Given the performance of LOCRF and HICOP on a typical 400-support request STSP dataset, employing them prior to MIP, GA or CT, is a very attractive way to reduce computational complexity and associated computer solve time. FIG. 2 is a diagram of a novel hybrid approach for solving scheduling problems in real-time in accordance with the present invention. As illustrated, in this hybrid approach, the entire STSP daily support request dataset is first processed through LOCRF to produce a partial schedule of those supports that are "easy to schedule" without affecting the optimality of what follows. LOCRF also outputs the remaining support requests to HICOP, which then partitions the STSP (minus the LOCRF results) into multiple independent parts. Each of these partitions is then simultaneously sent to a preferred optimizer selected by an AI shell which selects the best optimizer for each partition based on each partition's statistical characteristics such as, for example, the number of tasks to be scheduled. The optimizer may be a different instantiation of the same algorithm for one or more partitions or may be a different algorithm for each.

Current preferred optimizers include: MIP, GA and CT, but others could be added as they prove operable. The present inventors' early test results suggest that an optimizer that works well for one partition may not be the best for another partition. In fact, this empirical finding is a key feature in connection with the present invention and is strongly supported in theory based on the so-called No Free Lunch (NFL) Theorem. The central result of this theorem is that there is no "best" algorithm class, type or form for any particular class of problems (including scheduling). Rather, the best algorithm for a particular problem or class of problems must be specialized to take advantage of the particular problem characteristics.

Although daily STSP satellite support request datasets are similar, the present inventors have found that they are different enough for the NFL theorem to be operative and have demonstrated that multiple approaches to solving the STSP within a single hybrid methodology is the most successful approach for providing a real-time, operational solution to a wide variety of scheduling problems.

As shown in FIG. 3, a post-optimizer heuristic may be used to "tweak" the results of the optimized subproblems so as to accommodate, insofar as possible, satellite operator preferences (e.g. "as soon as possible" and/or "as late as possible") that have not yet been addressed in the hybrid algorithm. Once tweaking is complete, the partial schedules from the LOCRF and the optimized partial schedules from each partition are combined into a single optimal STSP daily schedule.

The use of artificial intelligence to characterize a sub-set of scheduling requests and select an optimal algorithm from a plurality of candidate algorithms which is best suited for solving a scheduling problem having the characteristics embodied in a particular sub-set is another key feature of the present invention. The sequential application of LOCRF and HICOP, followed by AI selection of an optimizer algorithm for solution of the scheduling sub-set problems, has been shown to provide an optimal solution to the STSP in particular, and the complex "NP Hard" SP in general. In addition, since the AI selects the optimizer algorithm on the basis of sub-set characteristics, the hybrid algorithm, illustrated in FIG. 2, is adaptive to the problem at hand.

7. Artificial Intelligence Shell

The present inventors have statistically analyzed (using Bayesian statistics) many hundreds of scheduling problems vis α vis the time it took to solve each with particular algorithms (i.e., MIP, GA, CT). Through this analysis, they developed AI rules which relate the statistical properties of scheduling problems, such as the number of tasks to be scheduled, the amount of potential conflict between these tasks, the number of resources available to do the tasks (e.g., in the exemplar STSP problem, the number of RTS's available), etc., to the likely solve time for each optimizer. Based on these rules, the AI shell analyzes each sub-problem/partition passed to it by HICOP and selects the fastest optimizer. As the AI shell performs its task repetitively over time and over a number of scheduling problems, it keeps track of its own performance and adjusts its rules to improve that performance. The invention should not be viewed as limited to the current set of statistical parameters used to characterize scheduling problems or their associated rules. New parameters and rules will be added as additional experience and knowledge in the scheduling problem domain is gained.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What we claim is:

1. A computer readable medium whose contents include instructions that cause a computer system to perform a scheduling function upon receipt of scheduling input data and a scheduling command from a scheduler, by performing the steps of:

(a) receiving a set of scheduling input data comprising a plurality of requests for scheduling an event from the scheduler, wherein each scheduling request comprising the plurality of requests has a scheduling parameter connected therewith, and the set of scheduling input data includes at least one scheduling conflict;

(b) receiving a request command to perform a scheduling function from the scheduler;

(c) invoking the instructions contained on said computer readable medium to perform the scheduling function; and (d) providing the scheduler with a schedule having a minimum number of conflicts, wherein said instructions comprise a step of partitioning the set comprising a plurality of scheduling requests into a plurality of conflicting and non-conflicting subsets by invoking a low order conflict resolution filter.

2. The computer readable medium of claim 1 wherein said instructions further include a step of invoking a high order conflict partition filter to further partition said conflicting subsets into a second subset comprising mathematically independent conflicting subsets.

3. The computer readable medium of claim 2 wherein said instructions include the step of evaluating said parameters connected with each said mathematically independent conflicting subset of scheduling requests and selecting a preferred algorithm from a plurality of candidate algorithms, said preferred algorithm being operable for maximizing the number of said plurality of scheduling requests that are scheduled.

4. A method for scheduling a set consisting of a plurality of scheduling requests, wherein each scheduling request has at least one parameter connected therewith and wherein a plurality of the scheduling requests comprising the set are conflicting, the method comprising the steps of:

(a) partitioning the set comprising a plurality of scheduling requests into a plurality of conflicting and non-conflicting subsets by invoking a low order conflict resolution filter; then (b) invoking a high order conflict partition filter to further partition said conflicting subsets into a second subset comprising mathematically independent conflicting subsets; then (c) evaluating said parameters connected with each said mathematically independent conflicting subset of scheduling requests and selecting a preferred algorithm from a plurality of candidate algorithms, said preferred algorithm being operable for maximizing the number of said plurality of scheduling requests that are scheduled.

* * * * *